United States Patent
Wiggeshoff

(10) Patent No.: US 11,391,945 B2
(45) Date of Patent: Jul. 19, 2022

(54) AUTOMATIC POSITIONING OF HEAD-UP DISPLAY BASED ON GAZE TRACKING

(71) Applicant: Sony Interactive Entertainment LLC, San Mateo, CA (US)

(72) Inventor: Elke Wiggeshoff, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/008,486

(22) Filed: Aug. 31, 2020

(65) Prior Publication Data
US 2022/0066205 A1 Mar. 3, 2022

(51) Int. Cl.
*G02B 27/00* (2006.01)
*A63F 13/25* (2014.01)
*G02B 27/01* (2006.01)

(52) U.S. Cl.
CPC ........ *G02B 27/0093* (2013.01); *A63F 13/25* (2014.09); *G02B 27/0179* (2013.01); *G02B 2027/0187* (2013.01)

(58) Field of Classification Search
CPC ........... G02B 27/0093; G02B 27/0179; G02B 2027/0187; A63F 13/25
See application file for complete search history.

(56) References Cited

U.S. PATENT DOCUMENTS

| | | | | |
|---|---|---|---|---|
| 9,984,505 B2* | 5/2018 | Rimon | ................... | G06F 3/017 |
| 10,017,114 B2* | 7/2018 | Bongwald | ................. | B60R 1/00 |
| 10,067,341 B1* | 9/2018 | Breed | ................... | G02B 27/01 |
| 10,082,865 B1* | 9/2018 | Raynal | ............... | G02B 27/0093 |
| 2003/0101604 A1* | 6/2003 | McGivern | ............... | F41G 1/467 33/265 |
| 2005/0038856 A1* | 2/2005 | Krishnasamy | ........ | H04L 67/306 709/206 |
| 2013/0076787 A1* | 3/2013 | Mathieu | ................... | B60R 1/00 345/633 |
| 2013/0188258 A1* | 7/2013 | Mathieu | ................. | G08G 1/167 359/630 |
| 2014/0177064 A1* | 6/2014 | Sugiyama | .............. | B60K 35/00 359/630 |
| 2014/0240313 A1* | 8/2014 | Varga | ...................... | G06F 3/013 345/419 |
| 2014/0368535 A1* | 12/2014 | Salter | .................... | G06T 19/006 345/619 |
| 2015/0293585 A1* | 10/2015 | Seok | ........................ | G06F 3/013 345/156 |
| 2016/0266390 A1* | 9/2016 | Seo | ........................ | G09G 3/001 |
| 2017/0072305 A1* | 3/2017 | Watanabe | ............... | G06F 3/017 |
| 2017/0269370 A1* | 9/2017 | Sato | ........................ | G06F 3/013 |
| 2017/0270899 A1* | 9/2017 | Sato | ........................ | G09G 3/001 |
| 2017/0315608 A1* | 11/2017 | Shanware | ............ | G06F 3/0346 |

(Continued)

*Primary Examiner* — Dmitriy Bolotin
(74) *Attorney, Agent, or Firm* — Penilla IP, APC

(57) ABSTRACT

A method for placement of a head-up display (HUD) is provided, including: rendering a view of a virtual environment for display to a user; tracking a gaze of the user as the user engages in interactivity with the view of the virtual environment, wherein tracking the gaze of the user generates gaze data, the gaze data identifying locations within the view that the gaze of the user is directed towards during the interactivity; using the gaze data to determine a preferred location for positioning of a HUD in the view; positioning the HUD in the view at the preferred location.

5 Claims, 10 Drawing Sheets

(56) References Cited

U.S. PATENT DOCUMENTS

| | | | | |
|---|---|---|---|---|
| 2017/0322623 | A1* | 11/2017 | McKenzie | G06F 3/0346 |
| 2018/0231772 | A1* | 8/2018 | Han | G02B 27/0101 |
| 2018/0372923 | A1* | 12/2018 | Wijaya | G02B 30/27 |
| 2019/0278094 | A1* | 9/2019 | Huang | G06F 3/013 |
| 2019/0279407 | A1* | 9/2019 | McHugh | G06F 1/1694 |
| 2019/0317598 | A1* | 10/2019 | Aleem | G06F 3/013 |
| 2020/0142479 | A1* | 5/2020 | Aleem | G02B 27/017 |
| 2020/0225745 | A1* | 7/2020 | Molin | G06T 7/70 |

\* cited by examiner

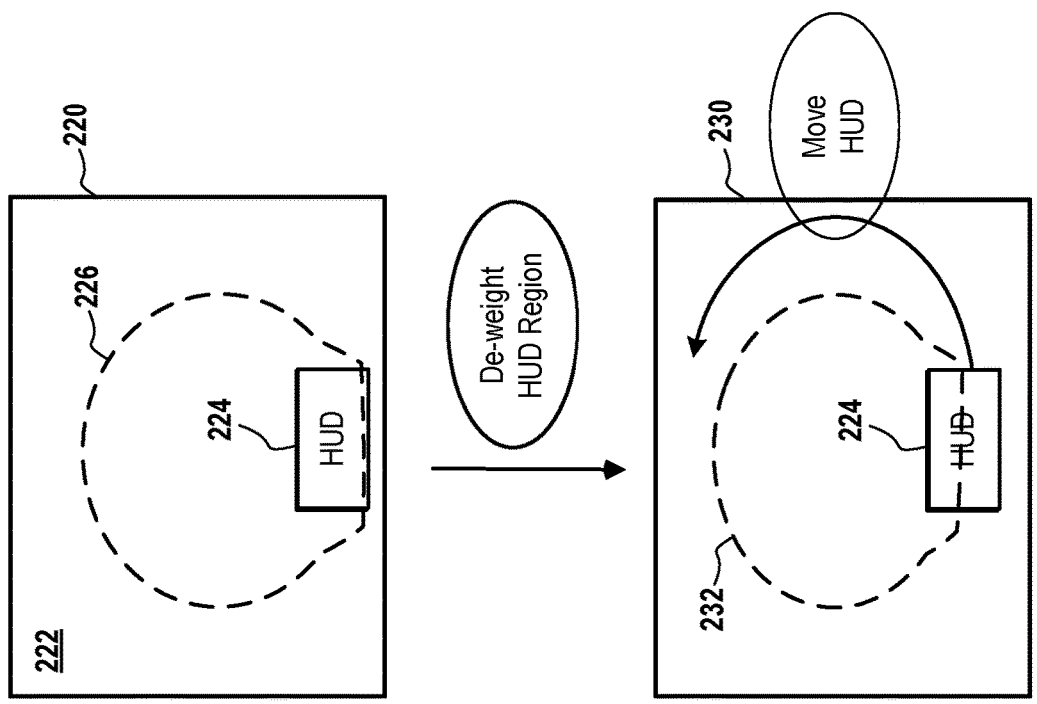
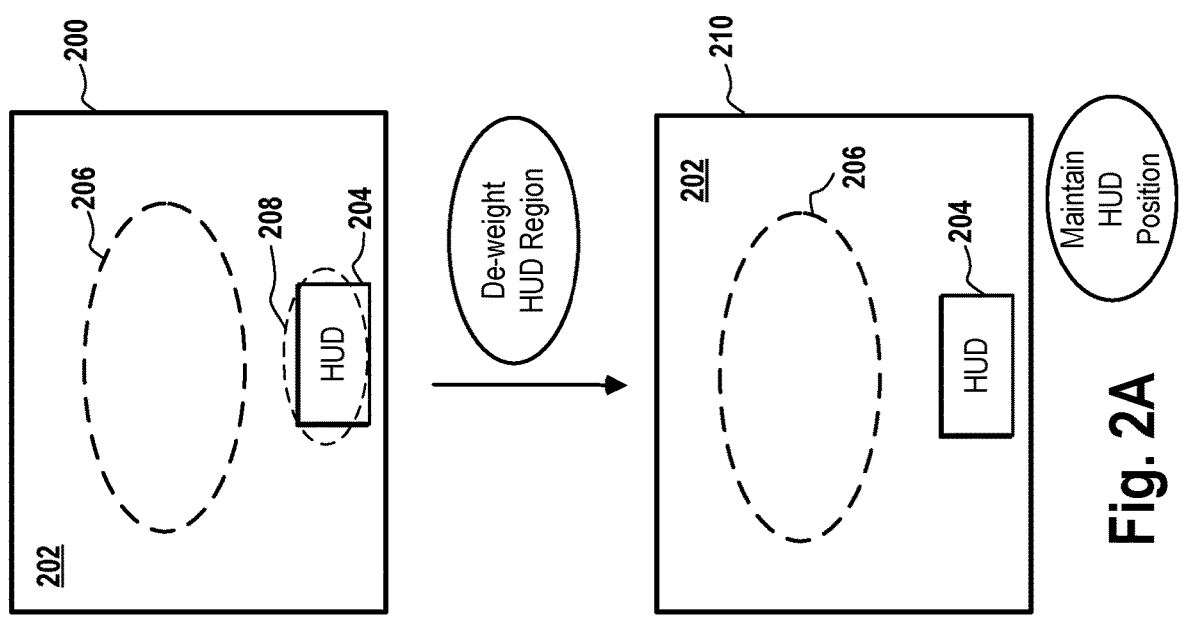
Fig. 2B
Fig. 2A

AUTOMATIC POSITIONING OF HEAD-UP DISPLAY BASED ON GAZE TRACKING

FIELD OF THE DISCLOSURE

The present disclosure relates to systems and methods for automatic positioning of a head-up display based on gaze tracking of a user.

BACKGROUND

Description of the Related Art

An area of continued development in the gaming industry is that of multi-player gaming, which is capable of providing collective gaming experiences to players that are geographically remote from each other. An expanding area of the gaming industry is that of sharing gameplay video and spectating gameplay. Users are now able to record and share their gameplay through websites, social media, etc. Furthermore, users may live-stream their gameplay, so that others can view their gameplay as it occurs in substantial real-time.

Another current trend in the gaming industry is a move towards cloud gaming. Cloud gaming provides advantages to the end user by enabling remote execution of a video game in a data center where the resources for the video game can be guaranteed. The video generated by the remotely executed video game is streamed to the user's equipment, and inputs from the user are sent back to the data center. This frees the end user from the need to own specific hardware in order to execute the game itself. Rather, the end user need only possess sufficient hardware to stream the gameplay, and may still enjoy a high quality gaming experience. Furthermore, in theory, cloud gaming enables gaming from any location where network connectivity is available.

A continuing trend in the video game industry is the increased sophistication of graphics and the availability of computing resources to meet the demands of modern game engines. As video games evolve, their resolutions and frame rates continue to increase, enabling rendering of very realistic and detailed virtual environments. Additionally, the popularity of cloud gaming continues to grow, and the shift to cloud executed video games enables even greater access to high quality gaming experiences.

It is within this context that embodiments of the disclosure arise.

SUMMARY OF THE DISCLOSURE

Implementations of the present disclosure provide systems and methods for automatic positioning of a head-up display (HUD) based on gaze tracking.

In some implementations, a method for placement of a head-up display (HUD) is provided, including: rendering a view of a virtual environment for display to a user; tracking a gaze of the user as the user engages in interactivity with the view of the virtual environment, wherein tracking the gaze of the user generates gaze data, the gaze data identifying locations within the view that the gaze of the user is directed towards during the interactivity; using the gaze data to determine a preferred location for positioning of a HUD in the view; positioning the HUD in the view at the preferred location.

In some implementations, using the gaze data to determine the preferred location includes analyzing the gaze data to identify a main gaze region of the user.

In some implementations, identifying the main gaze region of the user includes identifying an area of the view where an amount of the gaze of the user exceeds a predefined threshold.

In some implementations, determining the preferred location for positioning of the HUD is configured to be outside of the main gaze region of the user.

In some implementations, using the gaze data to determine a preferred location for positioning of the HUD includes determining a centroid of the tracked gaze of the user.

In some implementations, determining the preferred location for positioning of the HUD includes selecting one of a plurality of predefined locations for the positioning of the HUD.

In some implementations, positioning the HUD in the view includes moving the HUD from an existing location to the preferred location.

In some implementations, the interactive application is a video game, and wherein the virtual environment is defined for interactive gameplay of the video game.

In some implementations, the HUD is configured to display information or statistics relating to the interactive gameplay of the video game.

In some implementations, a method for placement of a head-up display (HUD) is provided, including: rendering a view of a virtual environment for display to a user; during interactivity by the user with the view of the virtual environment, tracking one or more features of the interactivity as the user engages in the interactivity, wherein tracking the one or more features of the interactivity generates feature data; using the feature data to determine a preferred location for positioning of a HUD in the view; positioning the HUD in the view at the preferred location.

In some implementations, using the feature data to determine the preferred location includes analyzing the feature data to identify patterns indicative of the preferred location for the positioning of the HUD.

In some implementations, analyzing the feature data is performed by a machine learning model.

In some implementations, determining the preferred location for positioning of the HUD includes selecting one of a plurality of predefined locations for the positioning of the HUD.

In some implementations, the features of the interactivity include one or more of a gaze of the user, gestures by the user, controller inputs, biometric inputs.

In some implementations, the interactive application is a video game, and wherein the virtual environment is defined for interactive gameplay of the video game.

In some implementations, a method for arranging elements of a head-up display (HUD) is provided, including: rendering a view of a virtual environment for display to a user; tracking a gaze of the user as the user engages in interactivity with the view of the virtual environment, wherein tracking the gaze of the user generates gaze data, the gaze data identifying locations within the view that the gaze of the user is directed towards during the interactivity; using the gaze data to determine a ranked order of predefined locations in the view, the predefined locations configured for respective placement of elements of a HUD in the view; positioning the elements of the HUD, respectively, in the predefined locations according to the ranked order.

In some implementations, the positioning of the elements of the HUD is configured to place the elements of the HUD in order of importance and according to the ranked order of the predefined locations.

In some implementations, using the gaze data to determine the ranked order includes analyzing the gaze data to identify a main gaze region of the user.

In some implementations, using the gaze data to determine the ranked order includes determining a centroid of the tracked gaze of the user.

In some implementations, the interactive application is a video game, and wherein the virtual environment is defined for interactive gameplay of the video game.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

FIG. 2A conceptually illustrates determining an optimal position for a HUD based on gaze tracking of a player, in accordance with implementations of the disclosure.

FIG. 2B conceptually illustrates deprioritization of gaze points in the vicinity of the HUD, to enable optimal placement of the HUD, in accordance with implementations of the disclosure.

DETAILED DESCRIPTION

Figure 1:
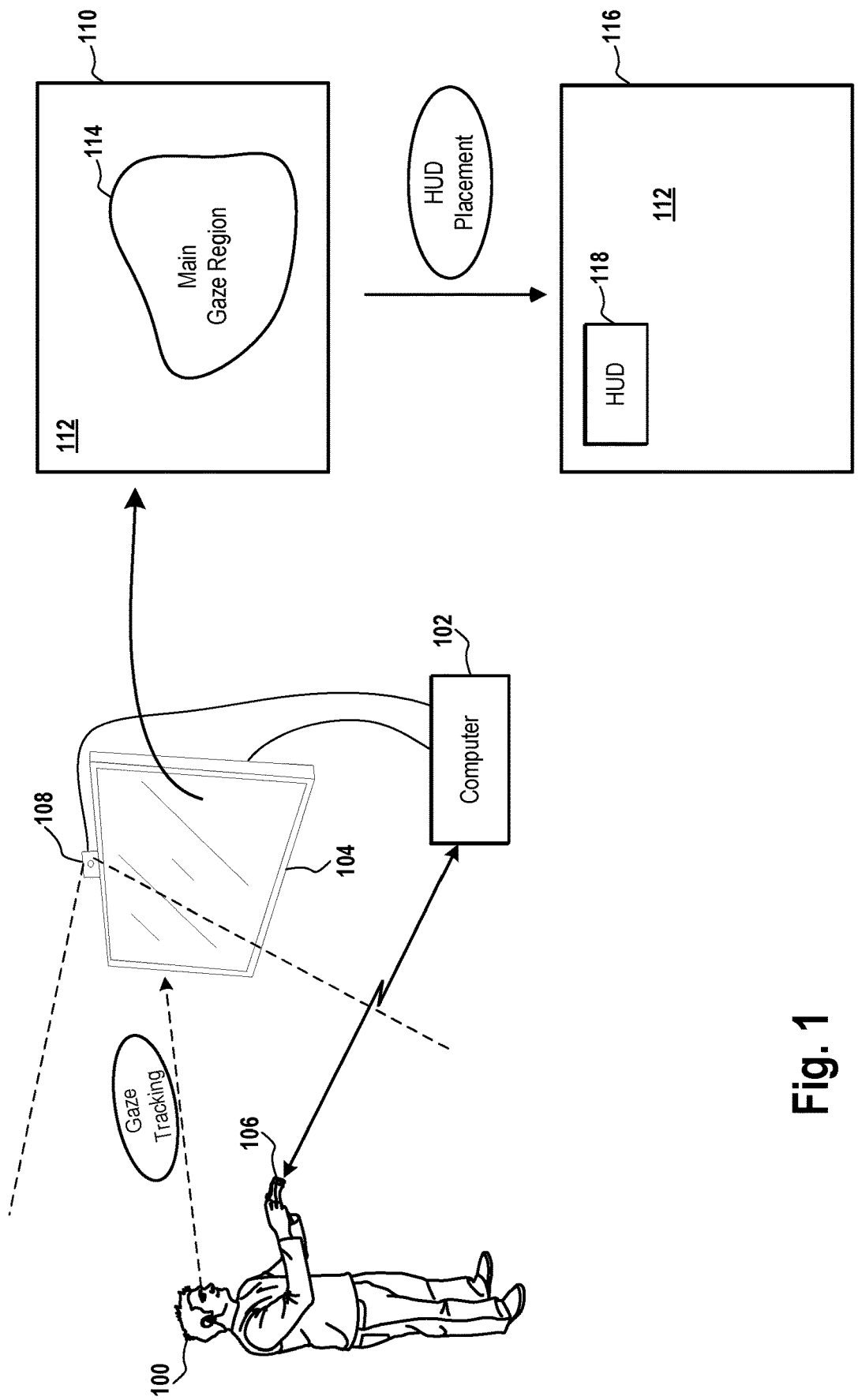
FIG. 1 conceptually illustrates optimized placement of a HUD based on tracked player gaze information, in accordance with implementations of the disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

As modern video games grow in complexity, the amount of information that is presented to a player can be very large. In turn, this causes the player's head-up display (HUD, e.g. including game-related information/statistics) to occupy a significant portion of the player's field of view. A problem therefore arises in that the HUD may interfere with the player's gameplay, such as by obscuring parts of the gameplay that the player is attempting to view, or making it more difficult for the player to view a given part of the gameplay. Because of the HUD, the player may need to reposition/redirect their view and/or character/avatar in order to more clearly view a desired portion of the gameplay.

In view of this problem, broadly speaking, implementations of the disclosure are drawn to methods and systems for gathering the field of view of a player of a video game/simulation through gaze tracking, and then automatically positioning the HUD in an optimal position for the player's eye movements. In some implementations, options are provided for additional fine-tuning of personal preferences which relate to the positioning of the HUD and/or the positioning of specific information within the HUD.

In some implementations, the field of view can be increased or decreased according to personal preferences, and the center of the point of view can be shifted according to personal preferences. It will be appreciated that a given player's personal preferences can be inferred from tracking of the player (e.g. gaze tracking, player input tracking, etc.) and/or explicitly user-defined by the player. In some implementations, the location of specific game statistics/information on the screen can be changed based on personal importance. For example, the default for a specific statistic could be moved from one corner to another corner of the screen (e.g. from lower right corner to upper left corner).

While implementations of the present disclosure are described with reference to a player of a video game, it will be appreciated that in other implementations, the principles of the present disclosure apply to any other type of simulation or interactive application in which a user engages in interactivity in a virtual environment.

Implementations of the disclosure are drawn to placement and adjustment of a head-up display (HUD, or heads-up display) in a video game or other simulation or interactive application. A HUD, as generally understood by those skilled in the art, is a typically persistent display of information related to the gameplay or interactivity taking place in a video game or simulation. In some implementations, there can be multiple HUDs. In some implementations, a HUD can be characterized as having multiple displays, multiple types of information or multiple elements. A HUD is rendered (typically as an overlay) in the user/player's view of a virtual environment, but the HUD is understood to be a display of information, and generally not part of the virtual environment itself in which gameplay interactivity occurs. (An exception to this would be a case in which the user interacts with a virtual object that itself includes a HUD, such as piloting an airplane or other vehicle that may include a HUD.) A HUD displays information that can be seen or referenced by the user/player during gameplay or interactivity, but generally is not itself the object of such gameplay or interactivity.

A HUD can include various kinds of information, including by way of example without limitation, values, amounts, numbers, descriptors, graphical indicators, or any other indicators of the following: scores, lives, health, energy, fuel, powers, ammunition, armor, weapons, tools, objects, skills, achievements, map, scene, level, ranking, speed, velocity, location, position, orientation, direction, altitude, objective, target, current time, elapsed time, time remaining, status, etc.

FIG. 1 conceptually illustrates optimized placement of a HUD based on tracked player gaze information, in accordance with implementations of the disclosure. In the illustrated implementation, a player 100 engages in gameplay of a video game that is executed by a computer 102. The computer 102 renders gameplay video of the video game for presentation on a display 104. The rendered gameplay video depicts a view of a virtual environment of the video game in which gameplay interactivity occurs. By way of example without limitation, in various implementations, the computer 102 can be a game console, personal computer, server computer, laptop, tablet, smartphone, portable gaming device, etc. In some implementations, the display 104 is a separate device from the computer 102, such as a television, monitor, lcd display, etc. In some implementations, the display 104 is integrated with the computer 102, such as the display of a laptop, tablet, smartphone, portable gaming device, etc. In some implementations, the display 104 is a head-mounted display (HMD), capable of providing an immersive view of the virtual environment of the video game. In some implementations, the player 100 operates a controller 106 to generate inputs for the video game. By way of example without limitation, in various implementations, the controller 106 can be a game console controller, keyboard, mouse, peripheral device, motion controller, camera, microphone, touchscreen, etc. The controller 106 can be separate from the computer 102 or integrated with the computer 102 and/or the display 104 (e.g. touchscreen display).

In some implementations, the computer 102 executes the video game. In some implementations, the video game is cloud executed, with the computer 102 acting as a thin client that receives, over a network (e.g. including the Internet) from a cloud gaming service, gameplay video for presentation on the display 104, and transmits inputs back to a cloud game machine that executes the video game.

As the player 100 engages in gameplay of the video game, the player's gaze is tracked. In some implementations, gaze tracking of the player is performed by processing images captured by a player-facing camera 108, wherein the captured images include the player's eyes. In various implementations, such a player-facing camera 108 can be a separate device, or can be integrated with the computer 102 or the display 104. For example, in the case of an HMD, the camera 108 can be integrated into the HMD and positioned inside the HMD so as to capture the player's eyes. Though for purposes of ease of description a single camera is referenced herein, it will be appreciated that in various implementations, more than one camera can be utilized for gaze tracking. In some implementations, two cameras are used that respectively track the player's left eye and right eye (e.g. in an HMD). In some implementations, multiple cameras are positioned to enable capturing the player from different angles in case the player changes their head location or orientation.

The player's gaze is tracked to enable determining and tracking where in the depicted view of the video game the player is looking. By tracking the player's gaze over time during gameplay, it is possible to identify a preferred gaze region for the player. In the illustrated implementation, shown by way of example without limitation, at reference 110, a view 112 of the virtual environment of the video game is presented to the player 100 during gameplay. The player's gaze is tracked during such gameplay to identify a main gaze region 114 of the view 112 that is the player's preferred area/region of the view 112 to look at, or the area of the view that the player primarily focuses upon during gameplay.

It will be appreciated that the view 112 is the depicted portion of the virtual environment that is presented through the display 104 for the player 100 to see, and as such, the view 112 changes as the player engages in gameplay. For example, in some implementations, the view 112 is a view of the virtual environment from the perspective of a virtual avatar (e.g. virtual character, vehicle, or other representative virtual object in the virtual environment) that is controlled by the player 100. In some implementations, the view is a first-person view, third-person view, over-the-shoulder view, or other type of view perspective associated with the player's virtual avatar. In the case of the display 104 being an HMD, typically a first-person view is presented. Again, the view 112 is the portion of the virtual environment presented through the HMD to the player, and in the case of an HMD, this is controlled by, and changes in accordance with, movements of the player's head wearing the HMD.

Gaze tracking is performed, which identifies and tracks the specific locations within the view 112 that the player's 100 eyes focus upon. In some implementations, the player's main gaze region 114 is identified by quantifying or measuring how much the player gazes at various portions of the view 112, and identifying which of the various portions the player gazes at the most. By way of example without limitation, in some implementations, the player gaze tracking identifies and records the locations of the player's gaze within the view 112 during gameplay. Accordingly, over one or more periods of gameplay, the gaze locations or gaze points of the player during gameplay are accumulated. Then, in some implementations, a threshold is applied to determine the player's main gaze region 114. Various examples of threshold determinations are provided by way of example without limitation.

In some implementations, the player's gaze points are mapped and the main gaze region 114 is identified as the region where the density of gaze points exceeds a predefined threshold. That is, the main gaze region is the area of the view where the number of gaze points per unit area exceeds a threshold value.

In some implementations, the main gaze region 114 is identified as the highest density region where the fractional amount of time of viewing by the player exceeds a predefined threshold. For example, the main gaze region 114 may be identified as the region with the highest density of gaze points where the player's gaze is directed N % (e.g. 65%, 70%, 75%, 80%, etc.) of the time during gameplay.

In some implementations, the main gaze region 114 is identified as the highest density region where the probability of the player's gaze falling within the region exceeds a predefined threshold. For example, the main gaze region 114 may be identified as the region with the highest density of gaze points such that the probability of the player's gaze being within the region is greater than a threshold probability.

Based on the identified main gaze region 114 of the player 100, then as conceptually shown at reference 116, the HUD 118 is positioned within the view 112 so as to be outside of the player's main gaze region 114. In this manner, the HUD 118 is less likely to interfere with portions of the view that the player prefers to focus upon during gameplay. In some implementations, the HUD is positioned so as to minimize overlap of the HUD with the main gaze region 114. In some implementations, the HUD is positioned immediately adjacent to, or at the periphery of the main gaze region. By way of example without limitation, in such implementations, if the main gaze region is smaller and concentrated in the center, then the HUD may be positioned closer to the center of the view; whereas if the main gaze region is larger and more spread out away from the center, then the HUD is positioned further from the center of the view.

In some implementations, the HUD 118 is positioned in one of multiple predefined locations for the HUD. For example, in some implementations, the HUD is positioned either on a left side or a right side of the view, with the specific side being selected so as to least interfere with the player's main gaze region 114. In some implementations, the HUD is positioned either on a top side or a bottom side of the view, with the specific side being selected so as to least interfere with the player's main gaze region 114. In some implementations, the HUD is positioned in one of four corners of the view (top left, top right, bottom left, bottom right), with the specific corner being selected so as to least interfere with the player's main gaze region 114.

In some implementations, the HUD is positioned in a default location, unless the default positioning causes the HUD to overlap the main gaze region 114, in which case the HUD is positioned at a different location, e.g. another predefined location that overlaps the main gaze region to a lesser extent. In some implementations, there is a priority ordering of predefined locations for the HUD, such that the HUD is placed at the highest priority predefined location that does not overlap the main gaze region, or that minimizes such overlap.

In some implementations, the player can be given the option to increase or decrease the size of their main gaze region. For example, the player may find that the HUD is interfering with their view or otherwise not placed to their satisfaction, and therefore may wish to increase their main gaze region and thereby have the HUD placed further away from their central vision area. In some implementations, the player is given the option to move the center of their main vision area, and thereby affect placement of the HUD.

In some implementations, the foregoing process of determining the player's main gaze region 114 and then determining the HUD position within the view can be included in a calibration or setup process for the video game. In some implementations, the video game may include calibration content that the player may play through in order to enable optimal positioning of the HUD as described. In some implementations, upon first playing a video game, the video game may have the player go through initial tutorials or learning exercises to teach controls, develop skills for playing the video game, etc. As part of this process, the player's gaze can be tracked during skill exercises or drills, and evaluated to determine HUD placement during the actual game campaign. In some implementations, the initial scenes of the video game do not include a HUD; however, the player's gaze is being tracked during the initial scenes, and in later scenes that include a HUD, the HUD is then placed based on the user's gaze tracking data as has been described.

In some implementations, an approximate center of the player's gaze points is determined, and this is used to determine the position of the HUD. In some implementations, the approximate center is determined by determining the centroid or geometric center of the gaze points. In some implementations, if the centroid deviates towards a given side or corner, then the HUD is positioned on a side or corner that is substantially opposite the side or corner toward which the centroid deviates. For example, if the centroid deviates to the left of center, then the HUD is positioned towards the right side; if the centroid deviates to the top, then the HUD is positioned towards the bottom; if the centroid deviates to the bottom left corner, then the HUD is positioned towards the top right corner; etc.

FIG. 2A conceptually illustrates determining an optimal position for a HUD based on gaze tracking of a player, in accordance with implementations of the disclosure. In some implementations, gaze tracking of a player during gameplay is applied to identify the player's preferred gaze region as has been described. However, if the HUD is also present during gameplay, then the region of the HUD will be an area of the player's view where the player also tends to direct their gaze. For purposes of identifying the player's preferred gaze region to enable optimal placement of the HUD, it is desirable to filter out the player's gaze points which result from the player looking at the HUD in its existing location, as these are not indicative of the player's preferred gaze locations for carrying out interactive gameplay, but rather are the product of the player seeking to obtain information from the existing HUD.

Therefore, in some implementations, gaze points which occur in a region that is substantially or approximately in a vicinity of the existing HUD are deprioritized, e.g. at least partially, de-weighted or discarded or otherwise reduced in terms of their effect on ascertaining the player's preferred/main gaze region. In the illustrated implementation of FIG. 2A for example, at reference 200, the player's view 202 of a virtual environment is represented, which includes a HUD 204, which is positioned at the bottom of the view 202 in the illustrated implementation. Based on gaze tracking data, it is determined that the player's preferred gaze regions (e.g. regions with high density of gaze points, such as greater than a threshold value) include a region 206 and a region 208. The region 206 is approximately near and about the center of the view 202. However, the region 208 is located substantially in the vicinity of the HUD 204. Accordingly, the gaze points of region 208 are de-weighted in some implementations, so as to lessen their importance in determining the player's preferred gaze region.

The result of deprioritizing the gaze points in the vicinity of the HUD 104 is conceptually shown as reference 210, in which the preferred gaze zone 206 is identified, without any additional preferred zone at the existing HUD's 204 location. In the illustrated implementation, it is determined that the HUD 204 does not interfere with the player's preferred gaze region 206, and thus the placement of the HUD 204 is maintained.

FIG. 2B conceptually illustrates deprioritization of gaze points in the vicinity of the HUD, to enable optimal placement of the HUD, in accordance with implementations of the disclosure. As shown at reference 220, the player's gaze is tracked during gameplay in which the player views a view 222 of a virtual environment. In the view 222, the HUD 224 is present, and positioned along the bottom of the view 222 (along the bottom of the screen/display viewed by the player). Because the view 222 includes the HUD 224, gaze tracking of the player to determine a first preferred gaze region 226 that values gaze points equally, including those in the vicinity or region of the HUD 224, will tend to include or overlap with the HUD 224, as the player has a tendency to look at the HUD 224 during gameplay.

However, by deprioritizing the gaze points that are in the vicinity of the HUD 224, then a more accurate representation of the player's preferred gaze region in the absence of the HUD can be obtained. As shown at reference 230, when the gaze points in the vicinity of the HUD 224 have been deprioritized, then a second preferred gaze region 232 is obtained. In this case, the second preferred gaze region 232 still overlaps the HUD 224 to some extent. As such, it is determined that the HUD is not optimally placed as it interferes with the player's preferred gaze region 232, even when discounting gaze points that are in the HUD vicinity. Accordingly, the HUD is moved to a new location, e.g. a location that does not overlap the preferred gaze region 232.

In some implementations, the extent to which gaze points in the vicinity of the HUD are deprioritized can be defined by a predefined weight or factor. In some implementations, gaze points are analyzed to determine whether the player was attempting to view the HUD or the virtual environment, and if it is determined that the player was viewing the HUD, then such gaze points are discarded. In some implementations, movement of the player's gaze is analyzed to determine whether the player was viewing the HUD or the virtual environment. For example, if the player's gaze jumps from another region of the view to the vicinity of the HUD, then it may be inferred that the player was viewing the HUD. Whereas if the player's gaze is drifting close to and into the vicinity of the HUD in a more continuous manner, then it may be inferred that the user was not viewing the HUD, but rather viewing the virtual environment. In some implementations, such principles can be incorporated into a weighting that is based on eye gaze movement. For example, for gaze points that are in the vicinity of the HUD, the greater the amount of gaze movement (e.g. gaze spatial movement, gaze movement speed, gaze acceleration/deceleration) that precedes such a gaze point, then the more such a gaze point is deprioritized (e.g. by reducing an applied weight/factor).

Figure 3A:
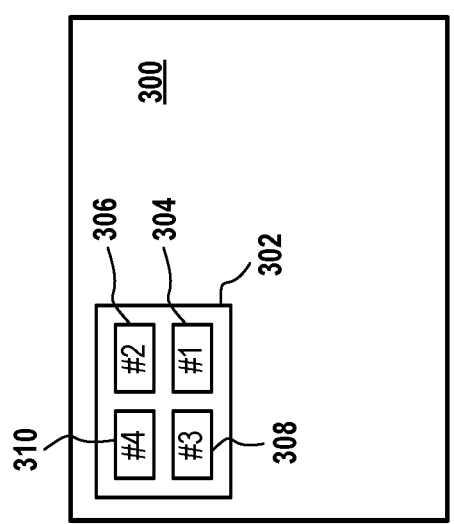
FIGS. 3A and 3B conceptually illustrate a priority ordering of locations within a HUD that depends upon the positioning of the HUD within the player view, in accordance with implementations of the disclosure.

In some implementations, different portions of the HUD can be arranged according to a prioritization scheme. For example, FIGS. 3A and 3B conceptually illustrate a priority ordering of locations within a HUD that depends upon the positioning of the HUD within the player view, in accordance with implementations of the disclosure. That is, as the HUD is moved to different locations, then so the arrangement of elements within the HUD is changed. In FIG. 3A, a HUD 302 is shown positioned in the upper left corner of the player view 300 of a virtual environment. The HUD 302 includes several elements, which can be several kinds of statistics or other game-related information in some implementations.

It will be appreciated that certain elements may be more important to a player than other elements, and accordingly it is desirable to position the elements in a priority ordering that enables the more important elements to be more easily visually accessed by the player. Hence, in some implementations, when the HUD 302 is positioned as shown in the upper left corner, then the various HUD elements 304, 306, 308, and 310 are positioned within the HUD as shown, with element 304 positioned at the bottom right of the HUD, element 306 positioned at the top right of the HUD, element 308 positioned at the bottom left of the HUD, and element 310 positioned at the top left of the HUD. In this manner, the higher priority elements 304 and 306 are positioned laterally closer to center (or more laterally central) than the lower priority elements 308 and 310. The highest priority element 304 is also positioned vertically closer to center (or more vertically central) than element 306.

Figure 3B:
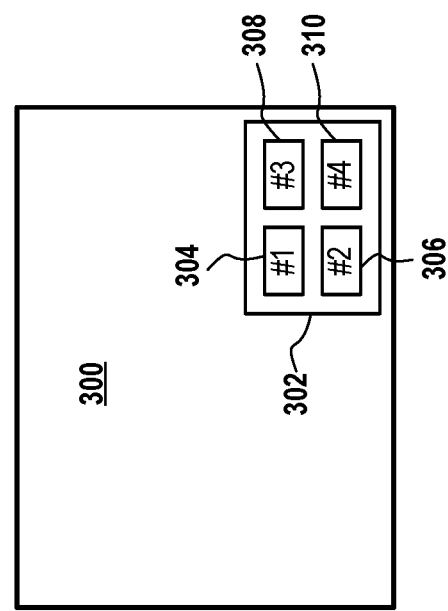

However, at FIG. 3B, the HUD 302 has been positioned at the lower right corner, and as a result the elements 304, 306, 308, and 310 are positioned differently. In this case, the higher priority elements 304 and 306 are positioned in the upper left and lower left of the HUD, thereby laterally positioning them closer to center than the lower priority elements 308 and 310, which are positioned in the upper right and lower right, respectively. Also the highest priority element 304 is positioned vertically closer to center than the element 306.

Accordingly, the HUD 302 is thus configured to define a priority ordering of predefined locations for the positioning of elements within the HUD, and the particular arrangement of the predefined locations changes depending upon the overall location of the HUD with the player view. The elements are positioned within the HUD at the various predefined locations according to their prioritization. In this manner, various elements of a HUD can be optimally arranged depending upon the HUD's overall location. While a specific example of a HUD 302 has been described it will be appreciated that in other implementations the specific arrangement of the HUD and the resulting change in the prioritized order of predefined element locations within the HUD can vary. In some implementations, as the HUD is moved, so the elements within the HUD are arranged so as to position higher priority elements more centrally (e.g. laterally closer to center and/or vertically closer to center) and/or closer to the player's preferred/main gaze region.

Figure 4:
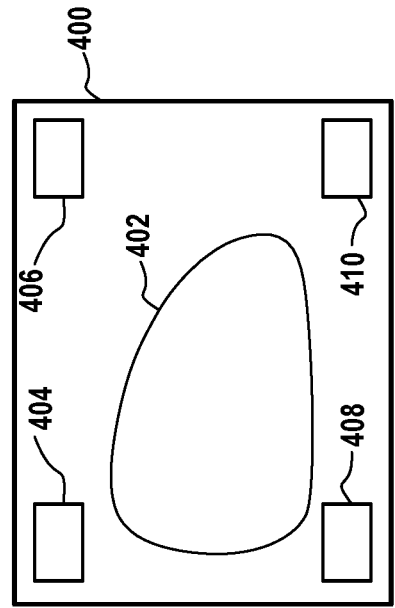
FIG. 4 conceptually illustrates placement of HUD elements at different locations based on a player's preferred gaze region, in accordance with implementations of the disclosure.
Figure 4:
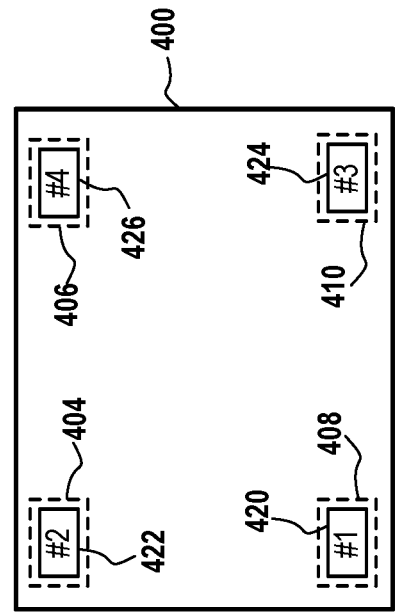

FIG. 4 conceptually illustrates placement of HUD elements at different locations based on a player's preferred gaze region, in accordance with implementations of the disclosure. In the illustrated implementation, a player view 400 of a virtual environment is conceptually shown, and a player has been determined to have a preferred gaze region 402 within the view 400. Various predefined locations 404, 406, 408, and 410 are defined for placement of HUD elements/information. In such an implementation, the HUD can be described as having multiple locations, in this case in the four corners, rather than a single location.

Furthermore, based on the determined preferred gaze region 402 of the player, the various predefined locations for HUD elements can be prioritized, so as to enable placement of HUD elements in order of importance according to the priority ordering of the predefined locations. For example, in the illustrated implementation, the preferred gaze region 402 of the player tends to favor the bottom left of the view, and therefore the predefined location 408, which is located in the bottom left corner, is ranked as the highest priority location for the placement of a HUD element, as this is the location closest to the player's preferred gaze region 402. In some implementations, the predefined locations are prioritized in order of proximity to the centroid of the player's gaze points or their preferred gaze region. And thus, the predefined location 408, being closest to the centroid of the preferred gaze region 402, is ranked first as the highest priority location. In the illustrated implementation, a HUD element 420 is ranked as being the most important, and is therefore placed at the highest priority location, which in the illustrated implementation, is the predefined location 408.

As the HUD elements are ranked in importance so they are placed at the predefined locations according to the priority ordering of the predefined locations. In the illustrated implementation, the predefined locations are prioritized, with location 408 prioritized first, followed in order by locations 404, 410, and 406. The HUD elements 420, 422, 424, and 426 are ranked in order of importance, with HUD element 420 ranked first, followed in order by HUD elements 422, 424, and 426. Accordingly, then along with placement of HUD element 420 at the location 408, HUD element 422 is placed at location 404, HUD element 424 is placed at location 410, and HUD element 426 is placed at location 406. In this manner, the HUD elements are placed by order of importance, according to the priority ranking of the predefined locations, so that more important HUD elements are more likely to be closer to the player's gaze at any given moment during gameplay.

Figure 5:
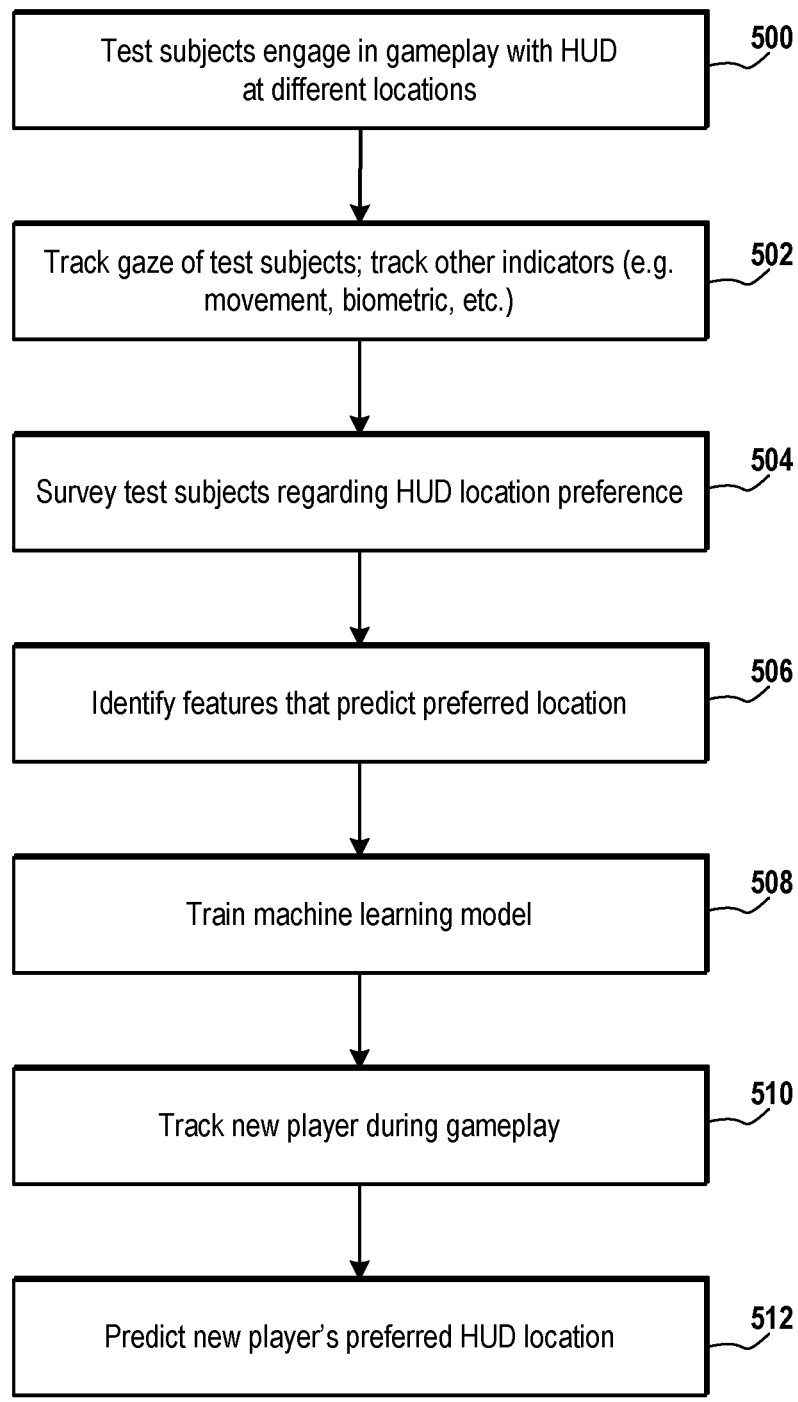
FIG. 5 conceptually illustrates a method for predicting a player's preferred HUD location, in accordance with implementations of the disclosure.

FIG. 5 conceptually illustrates a method for predicting a player's preferred HUD location, in accordance with implementations of the disclosure. Broadly speaking, in some implementations a new player's preferred HUD location is determined by first testing a number of subjects or players beforehand and evaluating the test results to identify features which are predictive of a given player's preferred HUD location. Accordingly, in the illustrated implementation, at method operation 500 a group of test subjects is tested by having them engage in gameplay of a video game, with the HUD being positioned in different locations. For example, for a given test subject, the HUD may be periodically moved to different locations within the test subject's view during gameplay (e.g. HUD is placed in each of four corners 25% of the time). Or the test subject may play multiple sessions of the video game with the HUD positioned at different locations in the different sessions (e.g. player plays four sessions, each session with HUD in different one of the four corners). In this way, the test subject experiences gameplay of the video game with the HUD being positioned at various locations in their view.

At method operation 502, the gaze of the test subjects is tracked during their gameplay. Additionally, other indicators or features relating to the test subjects' gameplay are also tracked. Examples of such additional features include, by way of example without limitation, test subject movements and gestures, facial expressions, controller inputs, controller movements, microphone input, success levels or achievement during gameplay or gameplay outcomes, biometric data such as galvanic skin resistance, heart rate, respiration rate, or any other activities of the user, etc. At method operation 504, following the gameplay sessions by the test subjects, then the test subjects are surveyed regarding their HUD location preferences. For example the test subjects may be asked to indicate through a survey their preference for HUD location by ranking in order from most preferred to least preferred the various locations at which the HUD was placed during their gameplay sessions. In the example of the HUD being placed at the four corners, a given test subject could be asked to identify which corner was their favorite for HUD placement, or to rank the various corners in order of preference.

At method operation 506, features are identified that enable prediction of a given player's preferred HUD location. In some implementations, a feature extraction process is performed, such as by a machine learning or artificial intelligence technique. It will be appreciated that the features that are predictive of preferred HUD location are determined from analysis of the test subjects' gaze as well as the other indicators or features which were tracked during their gameplay, as they relate to the test subjects' indicated preference for HUD location. For example, it might be determined that a player's pattern of eye gaze movements during gameplay, or gestures, or controller inputs, or any other features, alone or in combination, are predictive of the player's preferred HUD location. It will be appreciated that there may be patterns that identify when the HUD is optimally placed, and patterns that identify when the HUD is not optimally placed, and these can be recognized. Then at method operation 508, a machine learning model is trained to predict or determine a given player's preferred HUD location based on the given player's particular features that have been identified or extracted as described above.

At method operation 510, a new player is tracked during gameplay. That is, the identified features that are predictive of HUD location preference are tracked while the new player engages in gameplay of the video game. Then at method operation 512, the trained machine learning model is applied to the tracked features to determine/predict the new player's preferred HUD location. For example, the machine learning model may determine based on the new player's gaze patterns and/or other features that the HUD should be placed at a particular location. In some implementations, the HUD is automatically placed, or suggested to be placed, at the preferred location which has been determined for the new player.

In some implementations, the machine learning model is capable of recognizing when the HUD is not optimally placed based on the tracked features of the new player. In some implementations, when such is recognized, then the system is configured to suggest or ask the new player if they would like to move the HUD to a different location than its present configuration.

In various implementations of the present disclosure, when a preferred location of a HUD is determined or predicted for a given player, in some implementations, the HUD is automatically placed at the determined location. However, in other implementations, when a preferred HUD location is determined or predicted, then a suggestion is presented to the player, such as displaying a dialog box on screen, that suggests or recommends to the player placement of the HUD at the determined or predicted location. In some implementations, the player is given the option to confirm placement or repositioning of the HUD as suggested (e.g. by pressing a designated button on a controller device), or may cancel or reject the suggestion and/or manually position the HUD or select a location for the HUD.

In some implementations, when a new player begins playing a video game, they start with a default HUD location. However, as they play the game, then the player's gaze and other features are tracked, and then after enough data on the player has been collected, then an analysis (e.g. by a machine learning model) is performed to determine whether the HUD is optimally positioned, and/or the HUD should be moved to a specific location. This can be based on the player's detected gaze pattern and movements, as well as other features. In some implementations, the system suggests repositioning the HUD to the player, possibly to a specific location. If approved, then the HUD is repositioned, and the system may continue to monitor the player's gaze and other features as previously described. In this manner, the HUD placement is continuously optimized. Similar concepts and principles can be applied for specific placement and ordering of specific HUD elements.

In some implementations, the default placement of the HUD can be crowdsourced based on analyzing gaze data from players of the video game. For example, for a given scene of a video game (e.g. a temporal location, spatial location, level, chapter, place, challenge, or other identifiable gameplay location in the game), player gaze is tracked across a plurality of sessions/gameplays and players of the video game. Then the combined gaze data from the plurality of sessions is analyzed to determine the overall gaze pattern of the players, such as determining a main gaze region where player gaze is primarily focused during the scene. Based on this, a default HUD location can be determined, for example, to avoid interfering with the main gaze region, and the determined default HUD location can be used for the scene in future sessions of the video game. It will be appreciated that by crowdsourcing the HUD location on a scene-byscene basis, then the default HUD location can be optimized with specificity for the different scenes of the video game.

Figure 6A:
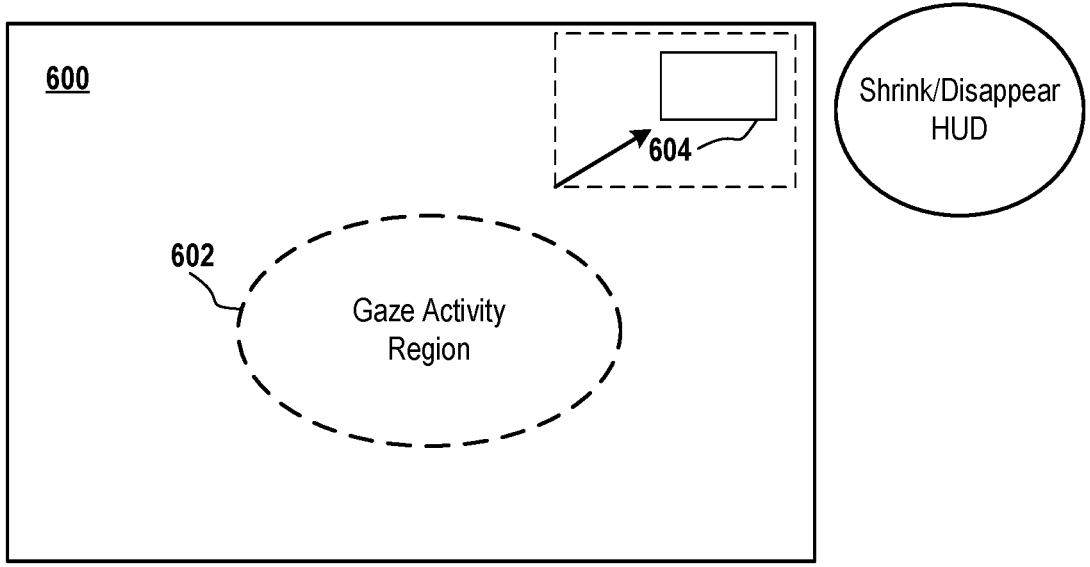
FIGS. 6A and 6B conceptually illustrate adjustment of the visibility of a HUD in response to player gaze activity, in accordance with implementations of the disclosure.
Figure 6B:
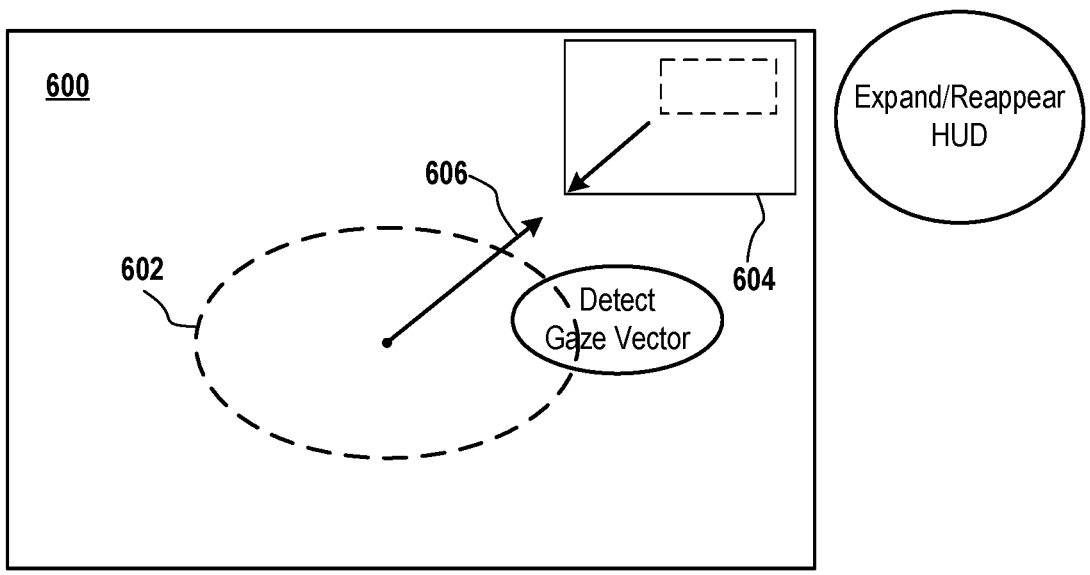

FIGS. 6A and 6B conceptually illustrate adjustment of the visibility of a HUD in response to player gaze activity, in accordance with implementations of the disclosure. In the illustrated implementation, a player view 600 of a virtual environment is conceptually shown. The player's gaze is tracked during gameplay and in the illustrated implementation, the player is determined to currently have a gaze activity region 602. The gaze activity region 602 is an approximate region where the player's gaze is determined to be currently primarily focused or centralized. In some implementations, the gaze activity region 602 is determined by identifying a region of the view in which at least a portion of the player's most recent gaze points are situated. For example, the player's gaze points can be tracked over a predefined recent time period (e.g. the most recent 0.5, 0.8, 1, 1.5, 2, 3, 4, 5 seconds, etc.), and a region having higher density of gaze points (e.g. density greater than a predefined value) can be identified as the gaze activity region 602. In some implementations, a region surrounding a centroid of the gaze points is identified as the gaze activity region 602. The region surrounding the centroid may have a predefined shape and/or size in some implementations, or may have a predefined radius in some implementations. Whereas in other implementations, the shape and/or size of the region surrounding the centroid may be determined based on the distribution of gaze points. For example, in some implementations, the shape and/or size of the region is determined to include a predefined fraction of the recent gaze points.

With continued reference to the illustrated implementation, as shown, the current gaze activity region 602 is focused approximately near the center of the view 600. In some implementations, when the gaze activity region 602 is thus situated, and not in the vicinity of the HUD 604, nor moving towards the HUD 604, then it may be inferred that the player is not attempting to view the HUD 604. And therefore in some implementations, the HUD 604 is shrunk or reduced in size or otherwise minimized in appearance. In some implementations, the HUD 604 is caused to disappear and thus ceases to be displayed. In some implementations, the HUD 604 is visualized as shrinking until it disappears. In some implementations, the HUD fades away by increasing in transparency until the HUD disappears.

With reference to FIG. 6B, when a movement of the player's gaze towards the location of the HUD 604 is detected, that suggests the player is attempting to view the HUD, then the HUD 604 is expanded in size and/or caused to reappear/display. In some implementations, a gaze vector is determined that indicates the direction and speed of movement of the gaze, such as indicated at reference 606. In some implementations, when the gaze vector is sufficiently towards the location of the HUD 604 (e.g. direction is towards the HUD, and speed is greater than a predefined amount), then the HUD 604 is caused to reappear if hidden, and/or expand in size if previously shrunk. In some implementations, when the player gaze reaches a location proximate to the location of the HUD (e.g. within a predefined distance of the HUD), then the HUD is expanded or displayed. Accordingly, the HUD is displayed when it is detected that the user is intending to see the HUD; and the HUD is otherwise minimized when it is determined that the user is not trying to see the HUD, so as not to intrude on or distract from the player's view of the virtual environment.

In some implementations, the readability of the HUD can be adjusted dynamically. For example, as the user's gaze is tracked during viewing gameplay and viewing of the HUD, the amount of time that the user spends viewing the HUD can be determined (e.g. amount of time (or average amount of time) that user gaze points are in the region/vicinity of the HUD). And based on this amount of time, the readability of the HUD can be inferred. That is, the longer it takes the user to view and comprehend the HUD, then the less readable the HUD is to the user. Conversely, the less time the user takes to view and comprehend the HUD, then the more readable the HUD is to the user.

Accordingly, aspects of the HUD can be automatically or dynamically adjusted based on the amount of time that the user takes to read the HUD. For example, in some implementations, the size of the HUD is increased or decreased (e.g. from a predefined default size; within a predefined range of sizes) as the amount of time spent viewing the HUD increases or decreases, respectively. In some implementations, the size of specific elements of the HUD, such as the font size of text information or specific graphical elements (e.g. meters, graphs, bars, charts, maps, etc.), is increased or decreased as the amount of time spent viewing the HUD increases or decreases, respectively.

Furthermore, in some implementations, HUD information such as statistics, etc., are read or vocalized to the user when the user's gaze direction is detected to be directed towards the HUD. In some implementations, a user-defined setting is provided to enable or disable reading of the HUD information. In some implementations, reading of HUD information is automatically initiated if it is determined that the user spends more than a predefined amount of time viewing the HUD. It will be appreciated that by vocalizing/reading the HUD, such a feature can better accommodate users with poor eye sight or dyslexia.

Figure 7:
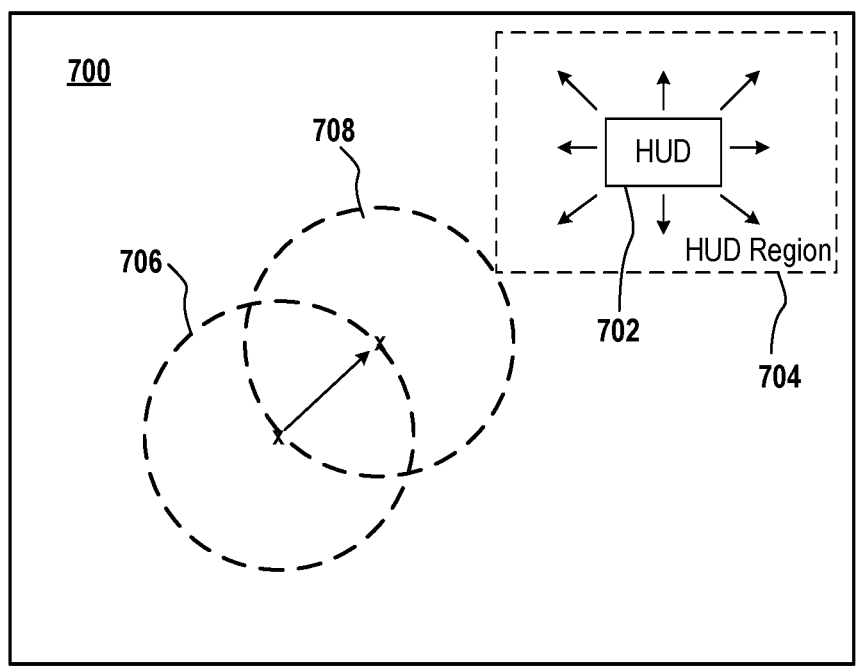
FIG. 7 conceptually illustrates dynamic positioning of a HUD in response to tracked gaze of a player, in accordance with implementations of the disclosure.

FIG. 7 conceptually illustrates dynamic positioning of a HUD in response to tracked gaze of a player, in accordance with implementations of the disclosure. In the illustrated implementation, a player view 700 of a virtual environment is conceptually shown. In the view 700, a HUD 702 is rendered. The HUD 702 is enabled to be dynamically positioned within a predefined HUD region 704. That is, the HUD 702 can be moved within the space of the predefined HUD region 704, as conceptually shown.

For example, in some implementations, when the player gaze moves or drifts towards the HUD, but the player is not attempting to view the HUD itself, then the HUD may be moved away from the player's gaze, but within the predefined HUD region 704. For example, in the illustrated implementation, the player may initially have a gaze region 706 where the player's gaze is currently/recently active and principally focused. At a later time, the player's gaze may move to define a new current gaze region 708 that is closer to the HUD 702, though this does not indicate the player attempting to view the HUD itself. It will be appreciated that determination of whether or not the player is attempting to view the HUD itself can be determined in accordance with implementations of the disclosure as described above. In some implementations, in response to the gaze region of the player moving closer to the HUD 702 in such a manner (that does not indicate intention to view the HUD itself), then the HUD 702 is configured to be moved or placed further away from the gaze region 708, but also within the boundary of the predefined HUD region 704. Thus, in the illustrated implementation, the HUD 702 can be moved towards the upper right of the HUD region 704 in response to such a movement of the player's gaze region.

Conversely, when the gaze region moves away from the HUD, then the HUD is configured to move closer to the current location of the player's gaze, but while staying within the predefined HUD region 704. Thus, with continued reference to the illustrated implementation, if the player's gaze region moves from the region 708 to the region 706, for example, then the HUD 702 can be moved towards the lower left of the HUD region 704. In this manner, the HUD is moved closer to where the player's gaze is focused, but within a predefined region and without interfering with the player's view of the virtual environment.

Thus in accordance with the above, the HUD 702 can be dynamically moved within a predefined region 704. It will be appreciated that in some implementations, when it is determined that the player is attempting to view the HUD itself, then the HUD 702 is not moved, but maintained in its position. In other implementations the HUD 702 can be moved towards the user so as to reduce the distance that the user is required to shift their gaze in order to focus on the HUD 702.

While tracking of a player's gaze region has been described, in some implementations, a centroid of the user's gaze (e.g. centroid of recent gaze points/locations) is tracked, and the HUD can be dynamically moved in response to movement of the centroid.

Figure 8:
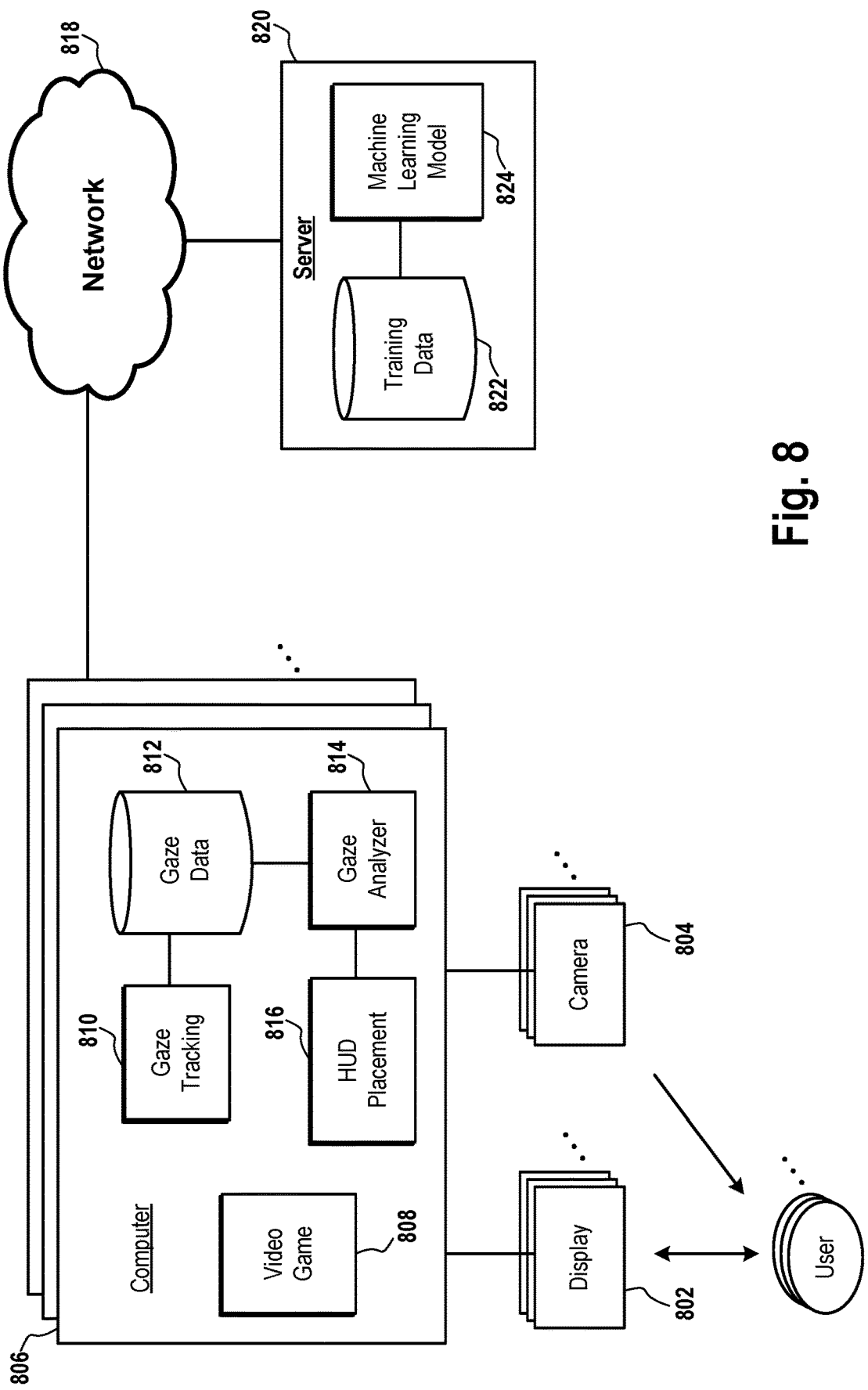
FIG. 8 conceptually illustrates a system for optimal placement of a HUD based on a user's tracked gaze information, in accordance with implementations of the disclosure.

FIG. 8 conceptually illustrates a system for optimal placement of a HUD based on a user's tracked gaze information, in accordance with implementations of the disclosure. Broadly speaking, the system of the illustrated implementation is capable of performing methods described above in accordance with implementations of the disclosure.

A user 800 engages in a interactivity with a simulation, such as gameplay of a video game, with a view of a virtual environment presented through a display 802. In the illustrated implementation, a video game 808 is executed by the computer 806, and the view of the virtual environment of the video game is rendered for presentation on the display 802 to the user 800. As the user 800 engages in gameplay, a camera 804 is configured to capture images for the user 800 to enable gaze tracking of the user 800. The computer 806 executes a gaze tracking logic 810 that is configured to process the captured images from the camera 804 to determine and track the user's gaze direction over time, and further store the resulting user's gaze information to a gaze data storage 812.

A gaze analyzer 814 analyzes the user's gaze information to determine where the user 800 prefers to look when viewing the view of the virtual environment. Based on the user's preferred viewing region/locations, then a HUD placement 816 is configured to optimally place the HUD for the video game at a location that minimizes interference with the user's preferred viewing region. In some implementations, the HUD is automatically placed, whereas in other implementations, the HUD is placed after obtaining confirmation from the user 800.

In some implementations, the computer 806 is local to the user 800, whereas in other implementations, computer 806 is accessible over a network 818, such as in a cloud gaming setup wherein a thin client local to the user streams gameplay over the network from the computer 806.

While in the illustrated implementation, a single user, display, camera, and computer have been described, it will be appreciated that there can be any number of users and corresponding displays, cameras, and computers.

In some implementations, a server 820 implements a machine learning model 824 that is trained using training data 822. In some implementations, the training data 822 includes the gaze tracking information and/or HUD placement information. The machine learning model can be trained to determine or predict a user's preferred HUD placement.

Implementations of the present disclosure can be included as part of a game engine. Broadly speaking, a game engine is a software-development framework providing features that enable efficient development of video games. A game engine can include a software library with reusable modules to handle various aspects of game functionality, including by way of example without limitation, graphics rendering (e.g. including vertex processing, polygon processing, shading, lighting, texturing, etc.), sound, physics (including collision handling), animation, scripting, artificial intelligence, networking, streaming, memory management, threading, localization support, scene graph, cinematics, etc.

Game engines can be optimized for different hardware platforms, such as game consoles, mobile devices, personal computers, etc. By way of example without limitation, a game engine may optimize memory use depending upon the platform (e.g. how to prioritize various tasks in the graphics pipeline, etc.). In some implementations, the hardware may be a bladed version of some specific processing entity, such as a game console. Thus, a user may be assigned to a specific blade, which gives the same hardware that a console game has been optimized for.

It will be appreciated that there can also be game server logic to provide streaming and/or other services (packetizing, encoding, quality of service (QOS) monitoring, bandwidth testing, access to social network/friends, etc.)

In some implementations, a cloud infrastructure may run a hypervisor, which abstracts the hardware and provides a virtual machine framework, upon which an operating system (OS) can be loaded. Thus, a stack may include the application/video game, running on an OS, which is loaded on a virtual machine (VM) instantiated by the hypervisor, which is loaded on underlying hardware. In this manner, the execution of the application is not necessarily coupled to specific hardware.

In some implementations, an application/video game may execute over a container, which abstracts at the application layer, packaging code and dependencies together, thus enabling software development agnostic of OS or hardware platform, and facilitating software portability across platforms.

In some implementations, a distributed game engine is employed wherein different parts of the game engine can be can be handled by different compute entities. For example, the functionality of the game engine such as physics engine, rendering engine (2D/3D graphics), sound, scripting, animation, AI, networking, streaming (encoding), memory management, threading, etc. can be divided into different functional processing blocks and/or services that are distributed among many different computes. It will be appreciated that for a distributed game engine, low-latency communication is required to avoid latency issues. To maintain desired frame rates, total time of computes and communication should meet certain constraints. Thus, it may or may not be efficient to divide certain tasks depending upon whether it is possible to complete the process in shorter time.

An advantage of using a distributed game engine is that it is possible to take advantage of elastic computing, wherein computing resources can be scaled up or down depending upon needs. For example, in a large multiplayer game executed traditionally on a single hardware server, after for example about 100 players, hardware resources become limited, so that more players cannot be added. The game may queue additional players, meaning that players must wait to join the game. However, with a distributed game engine, by using elastic cloud computing resources, more compute nodes can be added to meet demand, thus enabling for example thousands of players. The game is no longer constrained by the limits of a particular hardware server.

Thus, a cloud game engine can have functionality distributed to different processing entities. It will be appreciated that different functions can be executed in different frameworks. For example, some functions (e.g. social) might be easier to run in a container, whereas graphics might be better run using a VM connected to a GPU.

To facilitate distribution of the functionality of a cloud game engine, a distribution/synchronization layer can manage distribution of jobs, e.g. sending jobs out, receiving data back, identifying what tasks are performed and when, handling queueing e.g. if a job is finished faster than needed. In some implementations a given task could be dynamically subdivided if needed. For example, animation could have lighting, and if the lighting is especially complex, the lighting could be subdivided into three lighting jobs that are sent out for computing and reassembled upon return. Thus game engine functions can be subdivided if they require more work.

Cloud service providers provide computes at specified performance levels, for example in input/output operations per second ("TOPS"). Thus, a gaming provider may specify VMs, dedicated processing power, amount of memory, etc. from a cloud service provider and instantiate a distributed cloud gaming engine using the cloud service provider's systems.

In some implementations the library module and update handler can be one or more components or modules of a game engine. In some implementations, the library module and update handler can be separate components, or integrated. In some implementations the library module and update handler may operate as an addition to a game engine. In some implementations the game engine can be a distributed game engine, as noted above.

As noted, implementations of the disclosure can be applied to cloud gaming systems. One example of a cloud gaming system is the Playstation® Now cloud gaming system. In such a system, the client device can be a game console, such as a Playstation® 4 or Playstation® 5 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, and other user-related data that may require uploading of additional game content. In some embodiments, game content is made available by streaming the game content from the game cloud system to a user's computing device for viewing and interacting. In some implementations, after loading user specific data, the game content is available for game play.

Figure 9A:
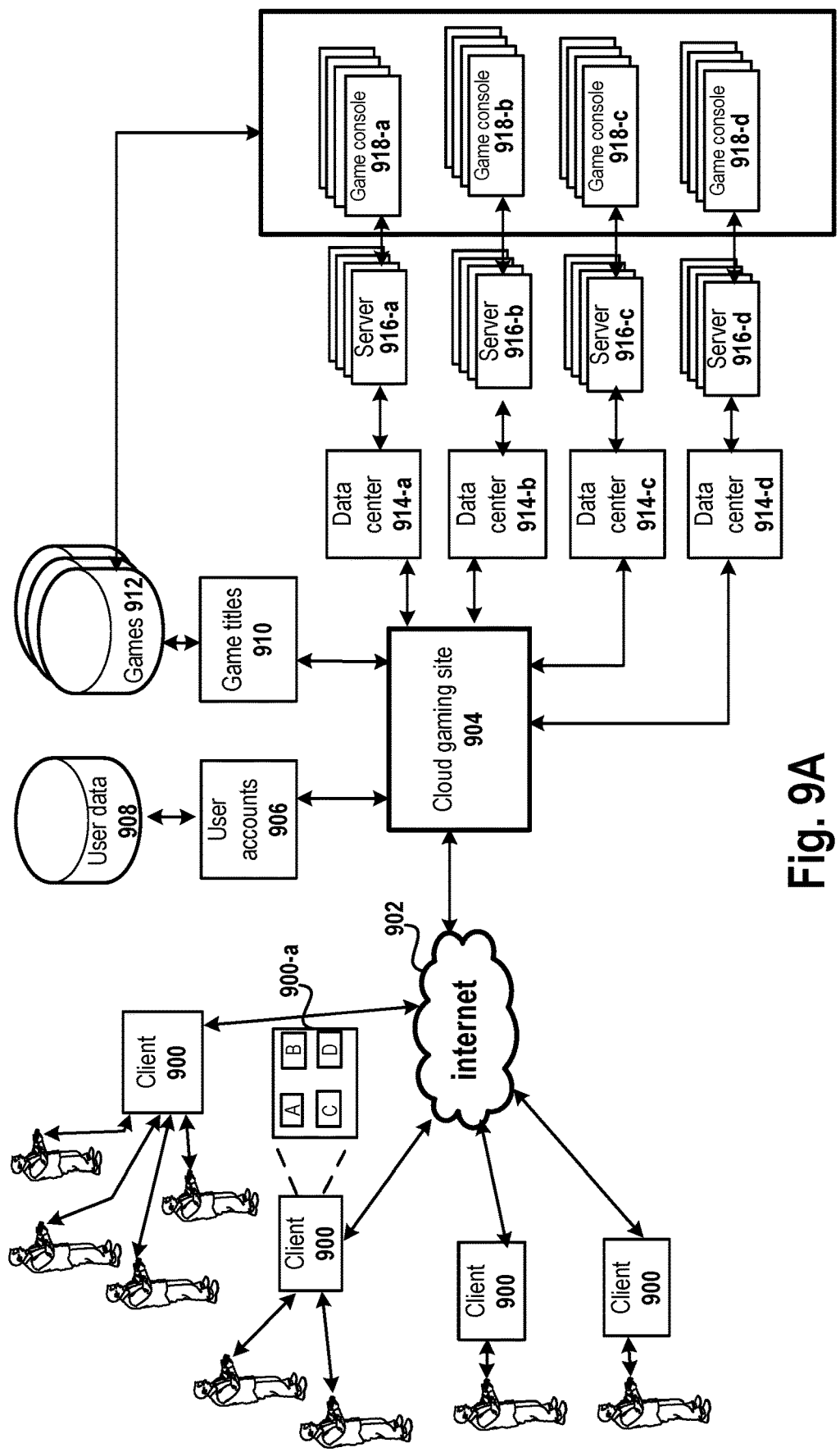
FIG. 9A illustrates an exemplary system used to load game files for a game available through a cloud gaming site, in accordance with implementations of the disclosure.

FIG. 9A illustrates an exemplary system used to load game files for a game available through a cloud gaming site. The system includes a plurality of client devices 900 that are communicatively connected to the cloud gaming site 904 over a network 902, which can include a LAN, wired, wireless, cellular (e.g. 4G, 5G, etc.), or any other type of data network, including the Internet. When a request to access the cloud gaming site 904 is received from a client device 900, the cloud gaming site 904 accesses user account information 906 stored in a user data store 908 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 910 to identify the game titles that are available at the game cloud site for the user account initiating the request. The game titles data store 910, in turn, interacts with a games database 912 to obtain the game titles for all the games that are available for the cloud gaming site. As new games are introduced, the games database 912 will be updated with the game code and the game titles data store 910 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 900-a, as shown in FIG. 9A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 9B:
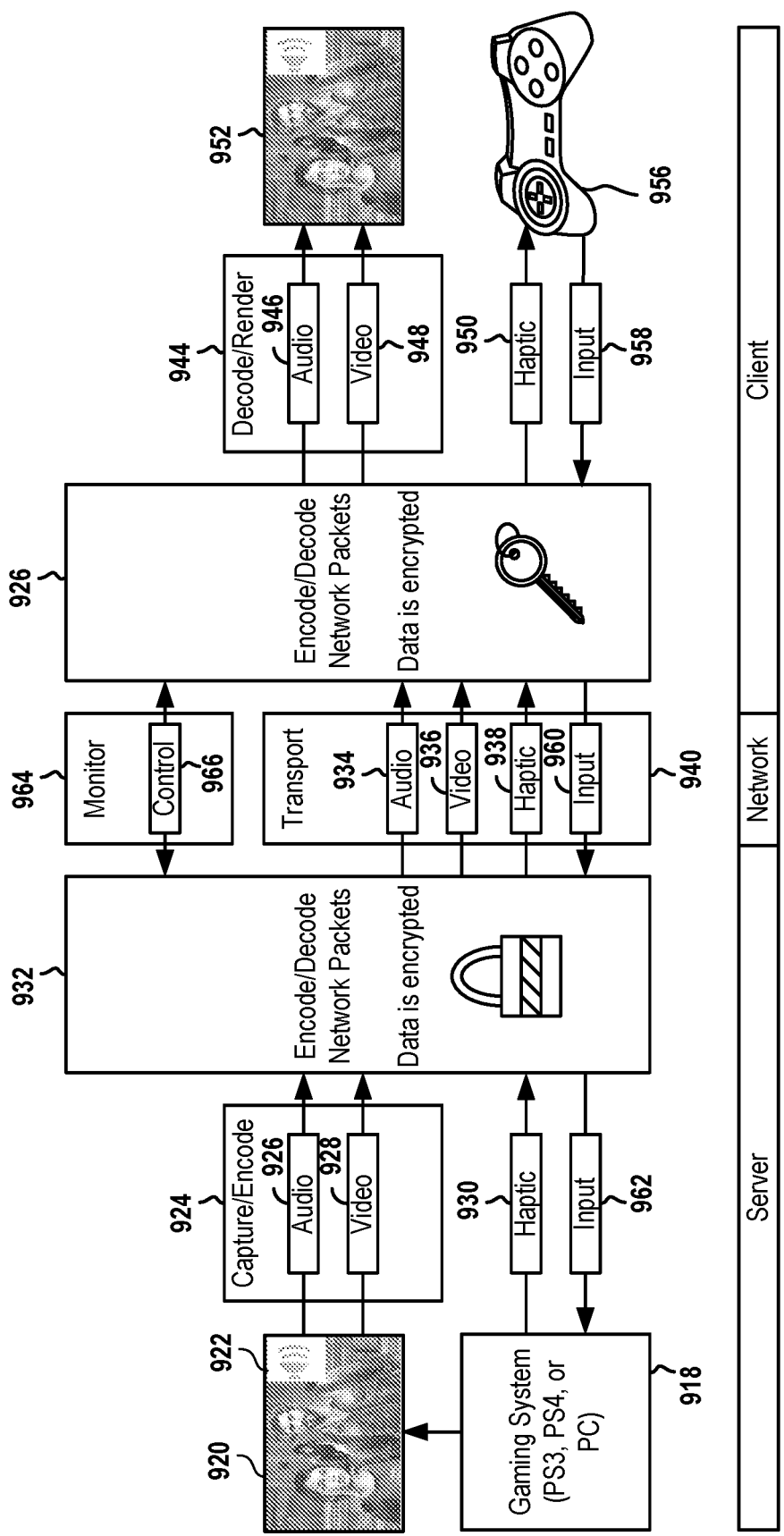
FIG. 9B is a flow diagram conceptually illustrating various operations which are performed for streaming a cloud video game to a client device, in accordance with implementations of the disclosure.

FIG. 9B is a flow diagram conceptually illustrating various operations which are performed for streaming a cloud video game to a client device, in accordance with implementations of the disclosure. The gaming system 918 executes a video game and generates raw (uncompressed) video 920 and audio 922. The video 920 and audio 922 are captured and encoded for streaming purposes, as indicated at reference 924 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 926 and encoded video 928 are further packetized into network packets, as indicated at reference numeral 932, for purposes of transmission over a network such as the Internet. The network packet encoding process can also employ a data encryption process, thereby providing enhanced data security. In the illustrated implementation, audio packets 934 and video packets 936 are generated for transport over the network, as indicated at reference 940.

The gaming system 918 additionally generates haptic feedback data 930, which is also packetized into network packets for network transmission. In the illustrated implementation, haptic feedback packets 938 are generated for transport over the network, as further indicated at reference 940.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 940, the audio, video, and haptic feedback packets are transported over a network, such as and/or including the Internet. As indicated at reference 942, the audio packets 934, video packets 936, and haptic feedback packets 938, are decoded/reassembled by the client device to define encoded audio 946, encoded video 948, and haptic feedback data 950 at the client device. If the data has been encrypted, then the network packets are also decrypted. The encoded audio 946 and encoded video 948 are then decoded by the client device, as indicated at reference 944, to generate client-side raw audio and video data for rendering on a display device 952. The haptic feedback data 950 can be processed/communicated to produce a haptic feedback effect at a controller device 956 or other interface device through which haptic effects can be rendered. One example of a haptic effect is a vibration or rumble of the controller device 956.

It will be appreciated that a video game is responsive to user inputs, and thus, a similar procedural flow to that described above for transmission and processing of user input, but in the reverse direction from client device to server, can be performed. As shown, a user operating controller device 956 may generate input data 958. This input data 958 is packetized at the client device for transport over the network to the cloud gaming system. The input data packets 960 are unpacked and reassembled by the cloud gaming server to define input data 962 on the server-side. The input data 962 is fed to the gaming system 918, which processes the input data 962 to update the game state of the video game.

During transport (ref. 940) of the audio packets 934, video packets 936, and haptic feedback packets 938, the transmission of data over the network can be monitored to ensure the cloud game stream quality of service. For example, network conditions can be monitored as indicated by reference 964, including both upstream and downstream network bandwidth, and the game streaming can be adjusted in response to changes in available bandwidth. That is, the encoding and decoding of network packets can be controlled based on present network conditions, as indicated by reference 966.

Figure 10:
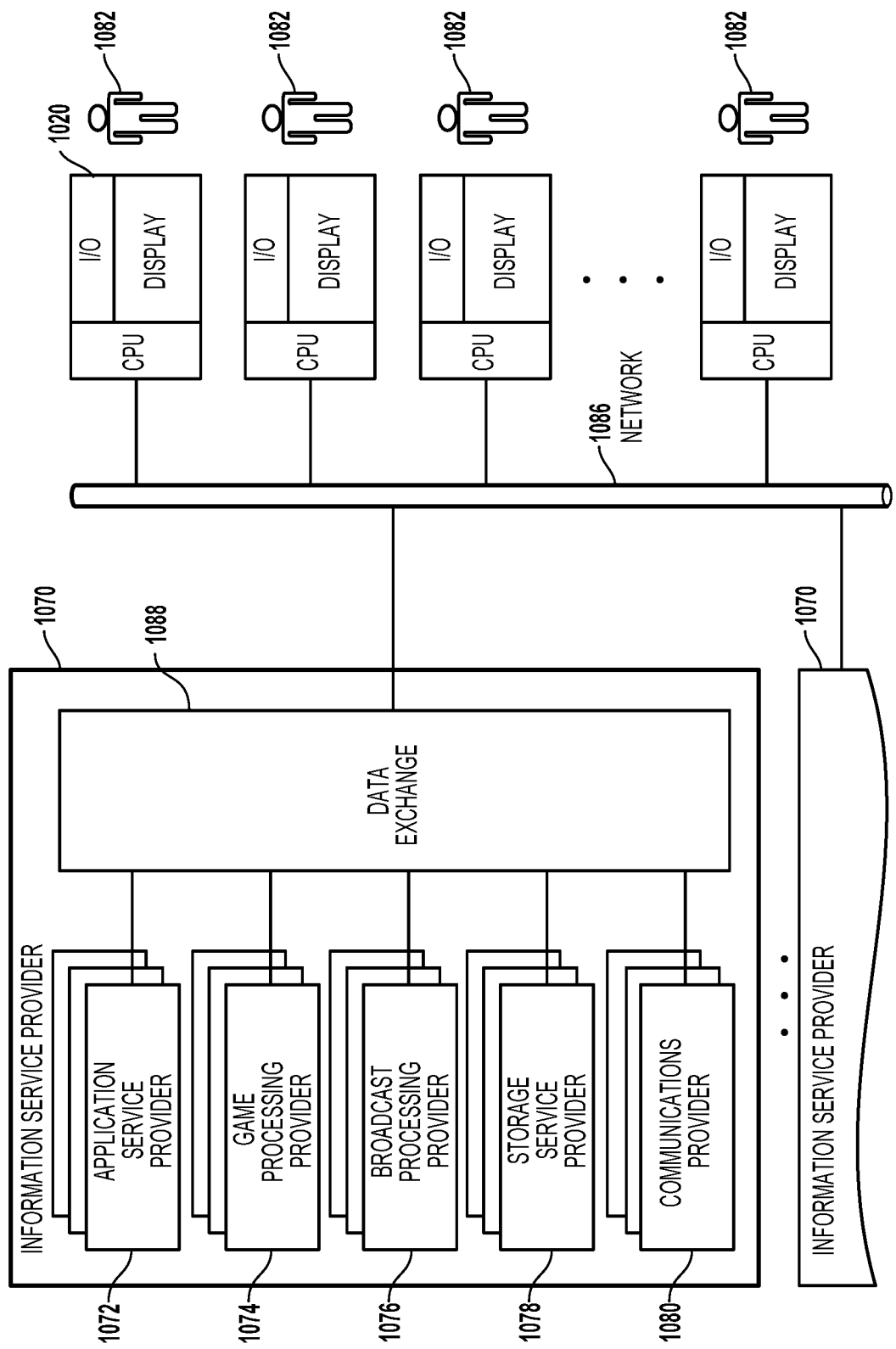
FIG. 10 illustrates an embodiment of an Information Service Provider architecture, in accordance with implementations of the disclosure.

FIG. 10 illustrates an embodiment of an Information Service Provider architecture. Information Service Providers (ISP) 1070 delivers a multitude of information services to users 1082 geographically dispersed and connected via network 1086. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1070 includes Application Service Provider (ASP) 1072, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a memory, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as html, to access ISP 1070.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method for arranging elements of a head-up display (HUD), comprising: rendering a view of a virtual environment for display to a user;
   tracking a gaze of the user as the user engages in interactivity with the view of the virtual environment, wherein tracking the gaze of the user generates gaze data, the gaze data identifying locations within the view that the gaze of the user is directed towards during the interactivity;
   using the gaze data to determine a ranked order of predefined locations in the view, the predefined locations configured for respective placement of elements of a HUD in the view;
   positioning the elements of the HUD, respectively, in the predefined locations according to the ranked order.

2. The method of claim 1, wherein the positioning of the elements of the HUD is configured to place the elements of the HUD in order of importance and according to the ranked order of the predefined locations.

3. The method of claim 1, wherein using the gaze data to determine the ranked order includes analyzing the gaze data to identify a main gaze region of the user.

4. The method of claim 1, wherein using the gaze data to determine the ranked order includes determining a centroid of the tracked gaze of the user.

5. The method of claim 1, wherein the interactive application is a video game, and wherein the virtual environment is defined for interactive gameplay of the video game.

* * * * *